(12) United States Patent
Yanagi

(10) Patent No.: US 8,294,947 B2
(45) Date of Patent: Oct. 23, 2012

(54) IMAGE PROCESSING APPARATUS WITH FRONT AND BACK SIDE READING UNITS AND METHOD FOR CORRECTING A COLOR DIFFERENCE FOR A SPECIFIC COLOR

(75) Inventor: Naoyuki Yanagi, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 802 days.

(21) Appl. No.: 12/020,290

(22) Filed: Jan. 25, 2008

(65) Prior Publication Data

US 2008/0180706 A1  Jul. 31, 2008

(30) Foreign Application Priority Data

Jan. 30, 2007 (JP) ................. 2007-019474

(51) Int. Cl.
*G06F 15/00* (2006.01)
(52) U.S. Cl. ....... 358/1.9; 358/1.13; 358/1.15; 358/505; 358/474; 358/2.1; 358/520; 358/518; 358/504; 382/169; 347/224; 347/225; 347/232

(58) Field of Classification Search .............. 358/1.9, 358/1.13, 1.15, 505, 474, 2.1; 382/169
See application file for complete search history.

(56) References Cited

U.S. PATENT DOCUMENTS 5,874,988 A * 2/1999 Gu .................. 348/97
2008/0130022 A1* 6/2008 Dalal et al. ............ 358/1.9

FOREIGN PATENT DOCUMENTS

| JP | 2000-066650 A | 3/2000 |
| JP | 2002-351447 A | 12/2002 |
| JP | 2003-032504 A | 1/2003 |
| JP | 2006-229466 A | 8/2006 |

\* cited by examiner

*Primary Examiner* — Benny Q Tieu
*Assistant Examiner* — Paul F Payer
(74) *Attorney, Agent, or Firm* — Canon USA Inc. IP Division

(57) ABSTRACT

A specified specific color is input, and a patch pattern that contains a large number of patches corresponding to a color adjacent to the specific color is read by a front-side scanner and a back-side scanner. The color difference between read values for the front side and read values for the back side is corrected.

8 Claims, 14 Drawing Sheets

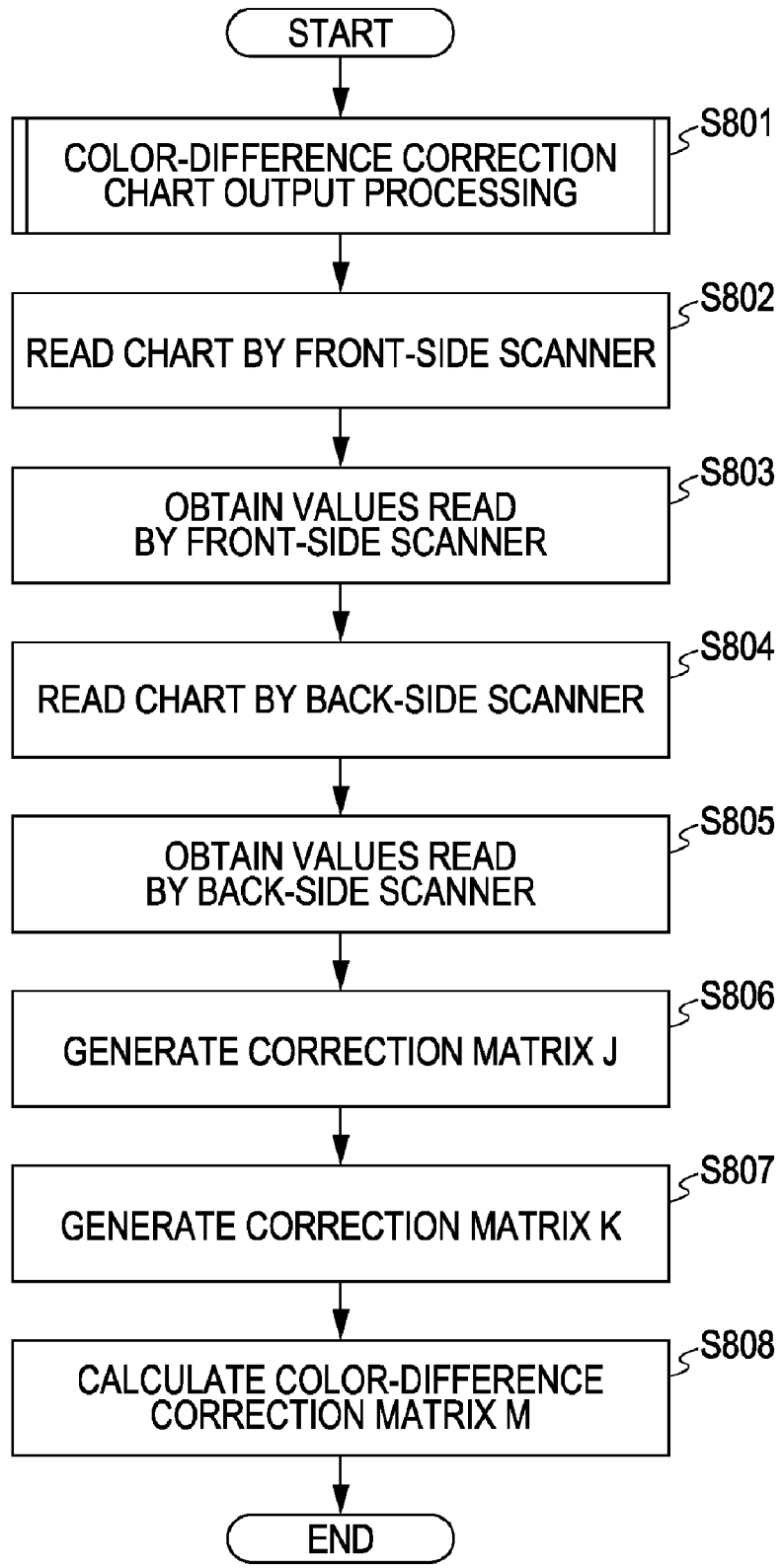

REGION WHERE SPECIFIC COLOR IS SPECIFIED

LOGO

MAIN-SCANNING DIRECTION

SUB-SCANNING DIRECTION

K C M Y R G B

IMAGE PROCESSING APPARATUS WITH FRONT AND BACK SIDE READING UNITS AND METHOD FOR CORRECTING A COLOR DIFFERENCE FOR A SPECIFIC COLOR

BACKGROUND OF THE INVENTION

1. Field of the Invention

The present invention relates to an image processing apparatus and an image processing method for reading an image of both sides of a document in a single conveyance and correcting a color difference between image signals for the front and back sides.

2. Description of the Related Art

Color copiers scan a document using a scanner, guide an image reflected by the document to a photoelectric conversion element (e.g., charge-coupled device (CCD) or a complementary metal oxide semiconductor (CMOS)), process a photoelectrically converted image signal, and form an image using an image forming unit. Such an image forming apparatus reads a first side (front side) of a duplex printed document, reverses the document, and then reads a second side (back side) of the document.

Reading apparatuses capable of reading both sides of a document (hereinafter referred to as duplex document reading apparatuses) using a device called a sheet through document feeder (hereinafter referred to as an SDF) have been developed. This type of reading apparatus includes a first reading sensor (unity-magnification sensor) for reading the front side of a document and a second reading sensor for reading the back side of the document. The first reading sensor is a contact sensor and is disposed within an SDF. The second reading sensor is disposed such that the document and a contact glass are arranged between the second reading sensor and the SDF. A color copier that includes such first and second reading sensors and that can read both sides of a document by causing the document to pass through between the first and second reading sensors has been developed.

An example of this type of reading apparatus using an SDF is an image forming apparatus (e.g., copier) that includes a unity-magnification reading sensor disposed within the SDF and used for reading a document, in addition to a scanner, and that can read both sides of the document without reversing the document by using the scanner together.

The first reading sensor uses a contact unity-magnification sensor as a reading unit for the structural reason that it is difficult to have a reduction optical system within the SDF. The second reading sensor includes a scanner (runner) for reading a thick document, such as a book, and a "stiff" document that is difficult to pass through the SDF, such as thick paper, in addition to a "thin" document readable by the SDF. However, a reduction reading sensor is used as a reading unit because it can have larger depth of focus.

It is preferable that image signals obtained by the first and second reading sensors reading the same document, that is, a first image signal from the first reading sensor and a second image signal from the second reading sensor be at substantially the same value. In shipping adjustment, the difference between values read by both sensors (first and second reading sensors) can be minimized. However, reading features of both sensors may change with time. In this case, it is necessary to correct the changed features using a simple process in a user operating environment.

One approach to addressing this problem is an image forming apparatus described in Japanese Patent Laid-Open No. 2003-032504. This image forming apparatus obtains RGB-γ conversion tables outputted from first and second reading units on the basis of a first image signal from the first reading unit reading a reference pattern and a second image signal from the second reading unit reading the same reference pattern, respectively. The image forming apparatus generates the RGB-γ conversion tables corrected such that the difference between image signals output by both reading units for RGB-γ converted read values is small. By use of the generated RGB-γ conversion features of both reading units, the image forming apparatus can reduce the difference between the read values obtained by reading of the same document by the two reading units.

The image forming apparatus described in Japanese Patent Laid-Open No. 2003-032504 uses a density gradation pattern that is previously stored and set as a reference pattern. Accordingly, by use of a gray-scale pattern having a wide range of colors, color matching can be evenly performed on a wide range of colors.

However, when an operator wants customization of colors or local color matching, it is required to generate a gray-scale optimized to a requested color. In this case, it is difficult for the apparatus described in Japanese Patent Laid-Open No. 2003-032504 to generate such an optimal gray-scale pattern because the apparatus uses a preset gray-scale pattern.

In actual use, for example, in the case of materials for a presentation, a wide range of colors are less prone to being used, and rather, local color matching biased to a specific hue of a logotype with high accuracy is desired.

SUMMARY OF THE INVENTION

The present invention provides an image processing apparatus including a first image reading unit configured to read image information of a front side of a document as an image signal and a second image reading unit configured to read image information of a back side of the document as an image signal. The image forming apparatus also includes a specific-color specifying unit, an outputting unit, and a color-difference correcting unit. The specific-color specifying unit is configured to specify a specific color. The outputting unit is configured to generate and output a patch pattern that contains a first number of patches corresponding to color adjacent to the specified specific color and a second number of patches corresponding to color other than the color adjacent to the specified specific color, the first number of patches being higher than the second number of patches. The color-difference correcting unit is configured to correct a color difference between the image signal read by the first reading unit and the image signal read by the second reading unit based on a first image signal obtained by reading of the patch pattern performed by the first image reading unit and a second image signal obtained by reading of the patch pattern performed by the second image reading unit.

The image forming apparatus according to an aspect of the present invention corrects a color difference between an image reading unit configured to read the front side of a document and an image reading unit configured to read the back side of the document based on a color specified by a user. Accordingly, the image forming apparatus can output an image whose reproducibility is enhanced preferentially for a specific color.

Further features of the present invention will become apparent from the following description of exemplary embodiments (with reference to the attached drawings).

BRIEF DESCRIPTION OF THE DRAWINGS

FIG. 8 is a flowchart of a process for correcting a color difference between the front and back sides.

DESCRIPTION OF THE EMBODIMENTS

Exemplary embodiments of the present invention will be described below with reference to the accompanying drawings.

First Embodiment

Figure 1:
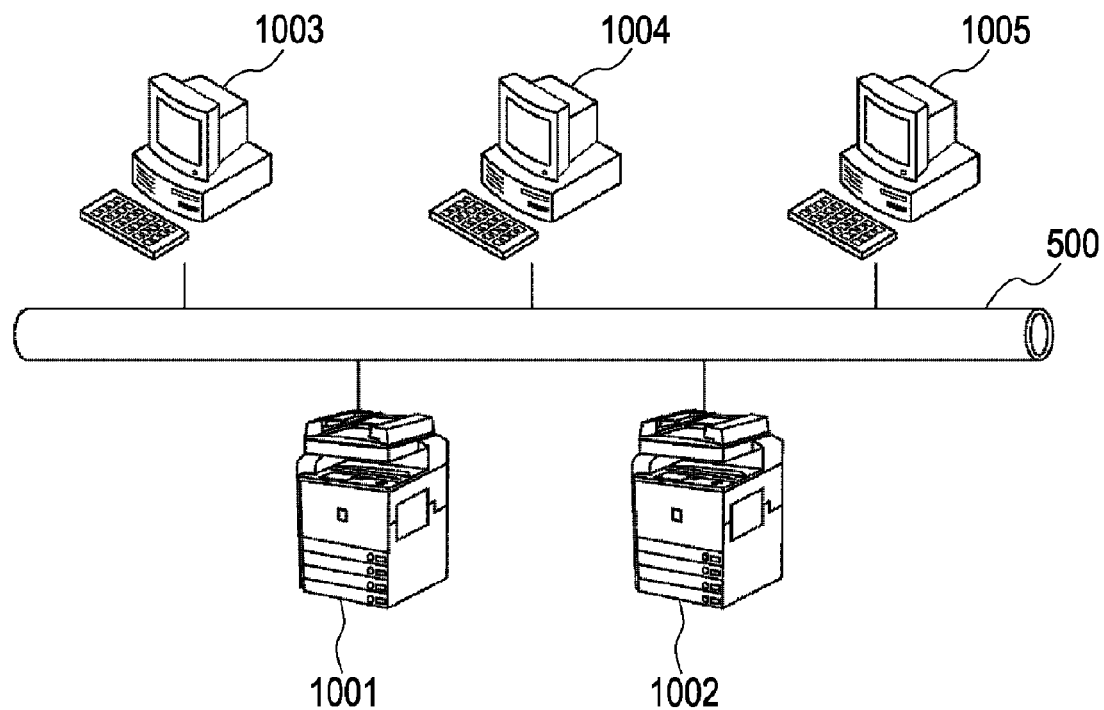
FIG. 1 illustrates a topology according to an embodiment of the present invention.

FIG. 1 illustrates a topology according to a first embodiment. As illustrated in FIG. 1, digital multifunction peripherals 1001 and 1002 and computers 1003 to 1005 are connected to each other via a LAN 500. The digital multifunction peripherals 1001 and 1002 contain the functions of copying, which optically reads a document, converts read data to digital image data, and prints it, of transmitting digital image data to the outside, and of printing the contents of image data and electronic mail received from the outside. The computers 1003 to 1005 contain the functions of generating and editing a digital image and transmitting data to the digital multifunction peripheral 1001 or 1002 as page-description language (PDL) code data.

Figure 2:
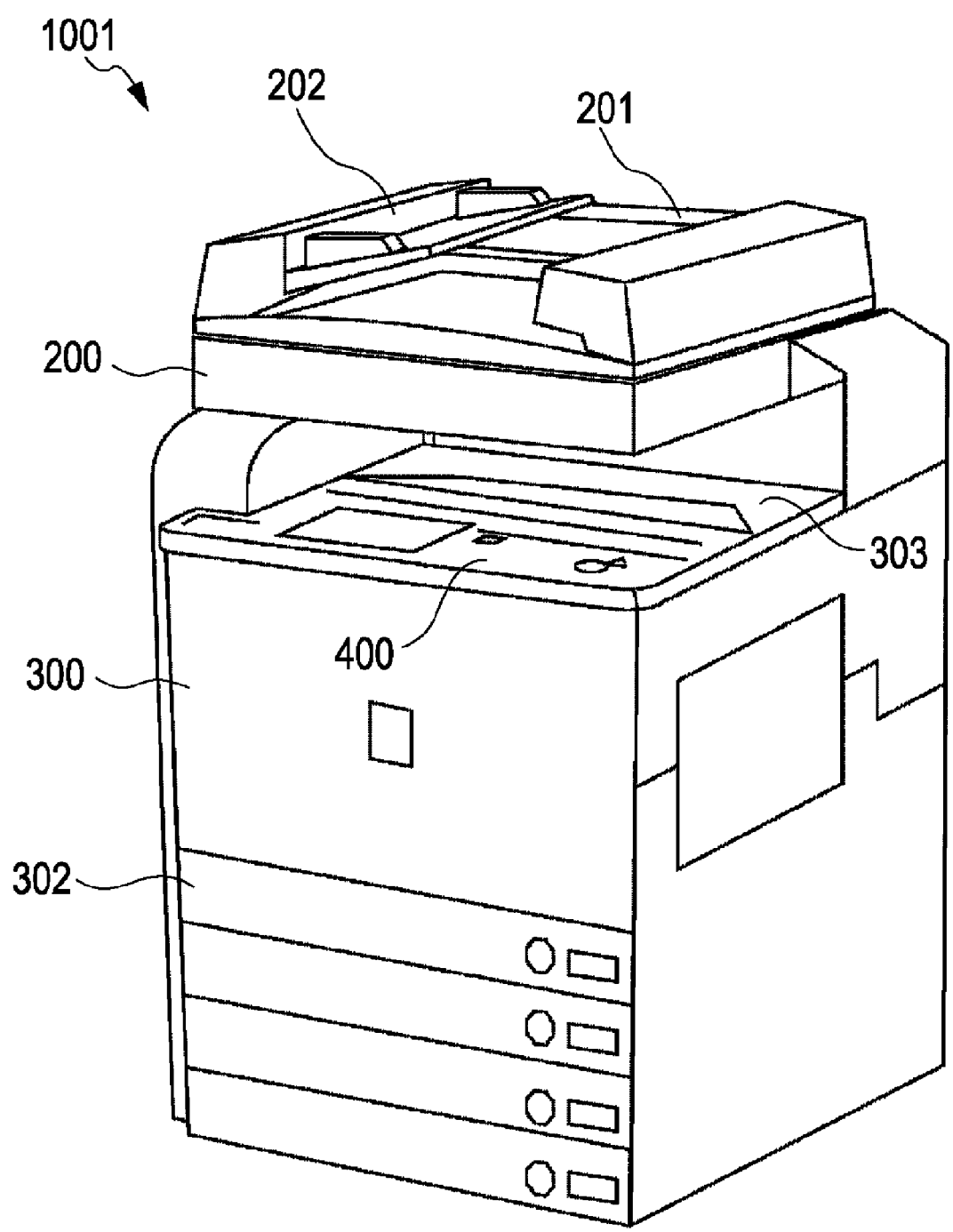
FIG. 2 illustrates an external view of a digital multifunction peripheral.

FIG. 2 illustrates an external view of the digital multifunction peripheral 1001. Referring to FIG. 2, a scanner unit 200 being an image input device illuminates an image on a sheet being a document and scans the sheet using a three-line CCD having color filters individually corresponding to RGB (not shown). The scanner unit 200 converts the amount of charge obtained by scanning the sheet by the CCD to an electric signal representing RGB color image data. One or more documents are set on a tray 202 of a document feeder 201. An operator directs the activation of reading from an operating unit 400. In response to this, a central processing unit (CPU) 103 of a controller 100, which will be described later with reference to FIG. 3, provides the scanner unit 200 with an instruction to make the document feeder 201 feed sheets of paper (documents) one by one to perform a reading operation on the image on each document.

Referring to FIG. 2, a printer unit 300 being an image output device is a portion that converts raster image data into an image to be formed on a sheet. Examples of a printing method include electrophotographic printing, which fixes toner on a sheet using a photosensitive drum or a photosensitive belt, and inkjet printing, which directly prints an image on a sheet by spraying ink from an array of minute nozzles. The print method in the present embodiment is not particularly limited. The activation of a printing operation starts in response to an instruction from the CPU 103 of the controller 100. A paper cassette 302 is a portion for accommodating sheets of paper to be fed to the printer unit 300. The paper cassette 302 may have a plurality of paper feed stages for allowing a user to select from among different paper sizes or different paper orientations. A paper output tray 303 is configured to receive printed paper.

Figure 3:
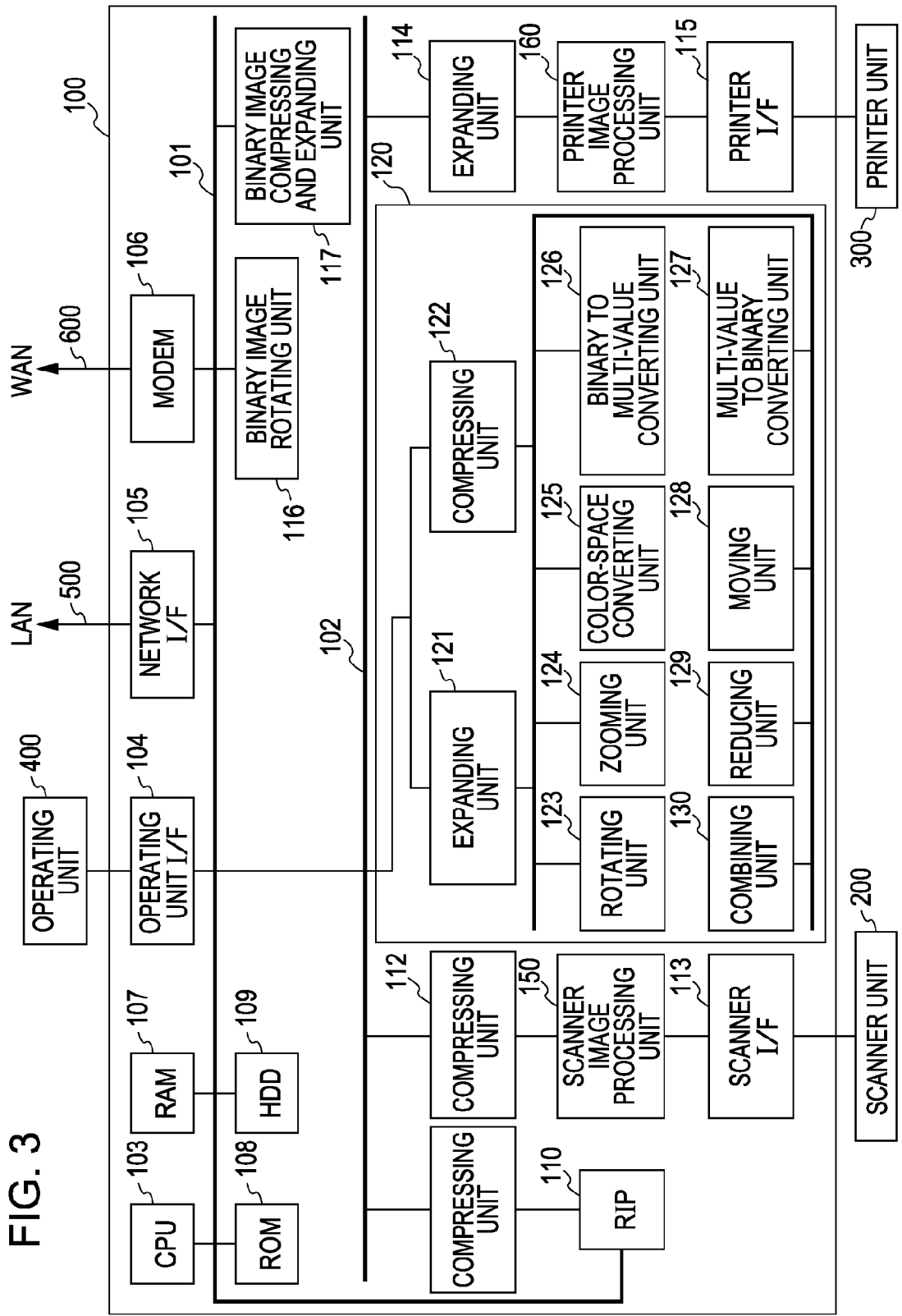
FIG. 3 is a block diagram that illustrates a configuration of a controller of the digital multifunction peripheral.

FIG. 3 is a block diagram illustrating the structure of the controller 100 in the digital multifunction peripheral 1001 more specifically. The controller 100 is electrically connected to the scanner unit 200 and the printer unit 300. The controller 100 is also connected to the computers 1003 to 1005 and the other external apparatuses via the LAN 500 or a wide area network (WAN) 600, thus enabling input and output of image data and device information.

The CPU 103 exercises centralized control of access from and to various connected devices in accordance with a control program stored in a read-only memory (ROM) 108 or other program and of various kinds of processing performed within the controller 100. A random-access memory (RAM) 107 is a system work memory for enabling the CPU 103 to operate and also for temporarily storing image data. The RAM 107 includes static RAM (SRAM), which retains stored contents even after the power is turned off, and dynamic RAM (DRAM), which removes stored contents after the power is turned off. The ROM 108 stores a boot program for the apparatus. An HDD 109 is a hard disk drive and can store system software and image data.

An operating-unit interface 104 is an interface unit for connecting a system bus 101 and the operating unit 400 to each other. The operating-unit interface 104 receives image data to be displayed on the operating unit 400 from the system bus 101, outputs the image data to the operating unit 400, and outputs information input from the operating unit 400 to the system bus 101.

A network interface 105 is connected to the LAN 500 and the system bus 101, thus enabling input and output of information. A modem 106 is connected to the WAN 600 and the system bus 101, thus enabling input and output of information. A binary-image rotating unit 116 changes the orientation of binary image data that has not yet been transmitted. A binary-image compressing and expanding unit 117 converts the resolution of binary image data that has not yet been transmitted into a predetermined resolution or a resolution suited for the ability of a receiver. Compression and expansion can use JBIG (joint bi-level image experts group), MMR (modified modified READ), MR (modified READ), and MH (modified Huffman). An image bus 102 is a transmission line for allowing exchange of image data and can include a PCI (peripheral component interconnect) bus or IEEE 1394.

A scanner image processing unit 150 corrects, processes, and edits image data received from the scanner unit 200 via a scanner interface 113. The scanner image processing unit 150 determines whether the received image data is color or black-and-white and whether it is text or a photograph. The scanner image processing unit 150 adds the determination to the image data. Such added information is referred to as attribute flag data. The details of this processing performed by the scanner image processing unit 150 will be described later.

Figure 4:
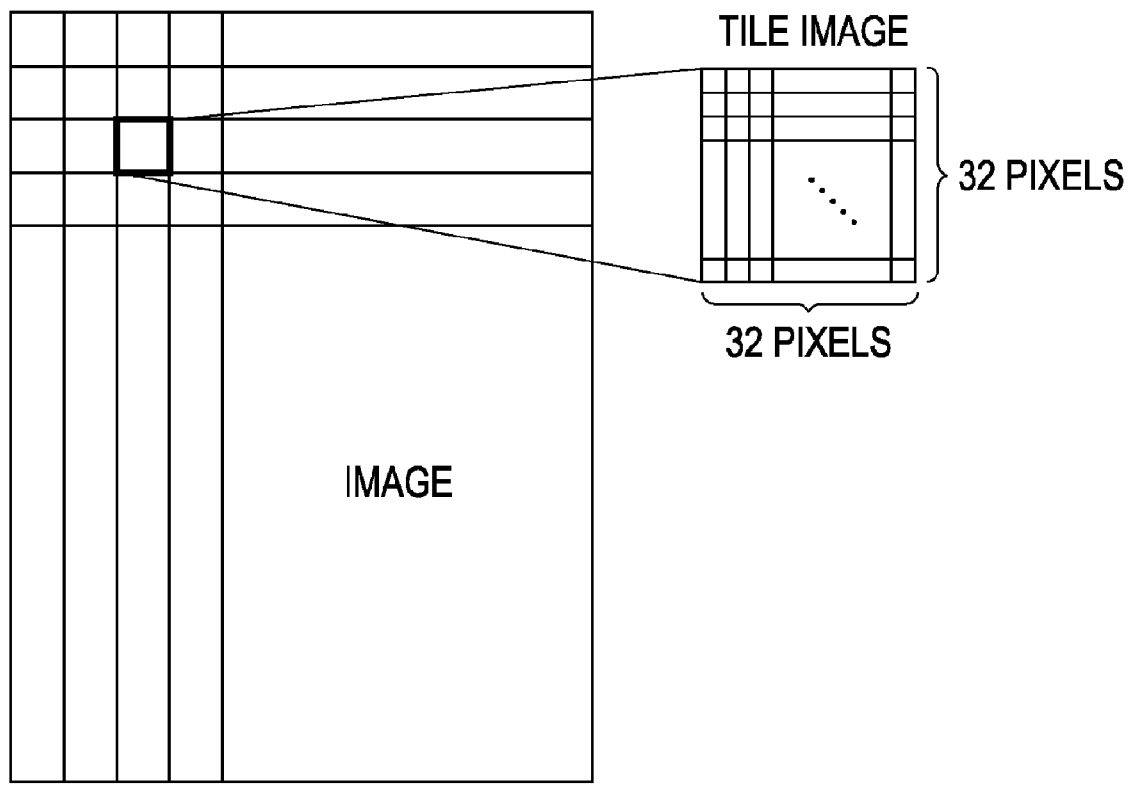
FIG. 4 is a conceptual diagram of tile data.

A compressing unit 112 receives the image data and divides it into blocks each having 32×32 pixels. The image data of 32×32 pixels is referred to as tile data. An example of the tile data is conceptually illustrated in FIG. 4. In a document (a paper medium that has not yet been read), a region corresponding to the tile data is referred to as a tile image. To tile data, information about the mean luminance of its block of 32×32 pixels and its coordinate position of a corresponding tile image on a document are added as header information. The compressing unit 112 compresses image data composed of a plurality of tile data elements. An expanding unit 114 expands image data composed of a plurality of tile data elements and then decompress it in raster format. The expanding unit 114 sends the data to a printer image processing unit 160.

The printer image processing unit 160 receives image data sent from the expanding unit 114, and performs image processing on the image data while referring to the accompanying attribute flag data. Image data on which image processing has been performed is output to the printer unit 300 via a printer interface 115. The details of this processing performed by the printer image processing unit 160 will be described later.

An image converting unit 120 is configured to perform predetermined conversion on image data and includes processing units described below.

An expanding unit 121 expands received image data. A compressing unit 122 compresses received image data. A rotating unit 123 rotates received image data. A zooming unit 124 converts the resolution of received image data (for example, from 600 dpi to 200 dpi). A color-space converting unit 125 converts the color space of received image data. The color-space converting unit 125 also performs publicly known background removal, publicly known LOG conversion (e.g., from RGB to CMY), and publicly known output-color correction (e.g., from CMY to CMYK). A binary to multi-value converting unit 126 converts received binary image data to 256-level grayscale image data. A multi-value to binary converting unit 127 converts received 256-level grayscale image data to binary image data by error diffusion or other techniques.

A combining unit 130 combines received two image data elements into a single image data element. The combining unit 130 can use, in combining two image data elements, a method of setting the mean value of luminance values for pixels of target image data elements as a combined luminance value and a method of setting the luminance value of a brighter pixel in luminance level as a combined pixel luminance value. The combining unit 130 can also use a method of setting the luminance value of a darker pixel as a combined pixel luminance value. The combining unit 130 can also use a method that determines a combined luminance value by OR operation, AND operation, or exclusive OR operation of pixels to be combined. All of these combining methods are known techniques. A reducing unit 129 converts the resolution by reducing pixels of received image data. A moving unit 128 adds a margin to received image data or deletes a margin therefrom.

A raster image processing (RIP) unit 110 receives intermediate data generated based on PDL code data transmitted from the computers 1003 to 1005 and generates multi-value bitmap data.

Figure 5:
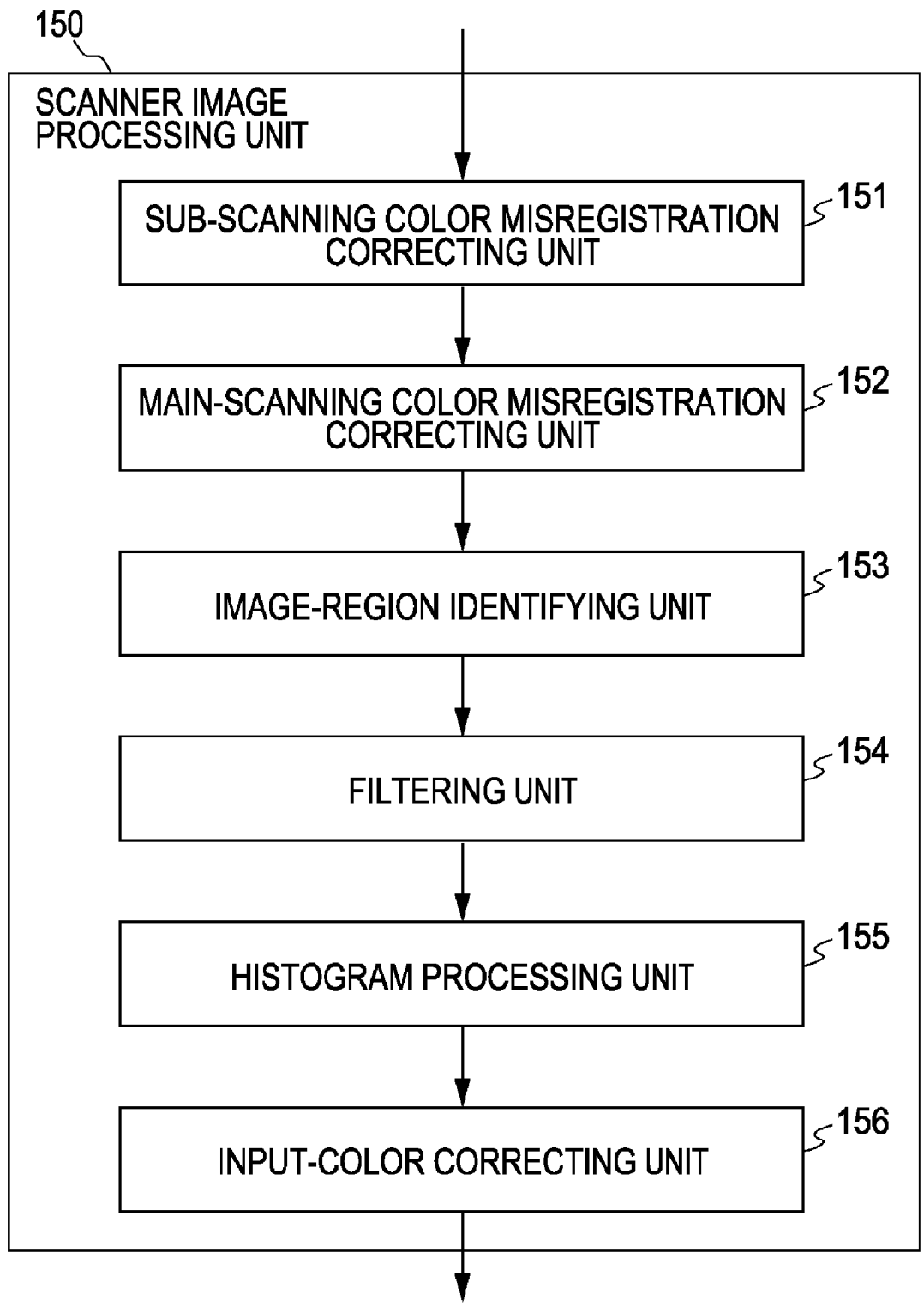
FIG. 5 is a block diagram that illustrates a detailed configuration of a scanner image processing unit.

FIG. 5 is a block diagram that illustrates a detailed configuration of the scanner image processing unit 150. The scanner image processing unit 150 is included in each of a scanner for reading the front side of a document and a scanner for reading the back side of the document. A sub-scanning color misregistration correcting unit 151 corrects color misregistration of an input image occurring in the sub-scanning direction and can perform, for example, a 1×5 matrix operation for each color of the image data.

A main-scanning color misregistration correcting unit 152 corrects color misregistration of an input image occurring in the main-scanning direction and can perform, for example, a 5×1 matrix operation for each color of the image data.

An image-region identifying unit 153 identifies the image type for each region of an input image. For example, the image-region identifying unit 153 can identify the image type from pixels constituting each of a photographic region, a text region, a chromatic-color region, an achromatic-color region, and other regions and generate attribute flag data representing the type for each pixel.

A filtering unit 154 corrects the spatial frequency of an input image to a desired value and can perform, for example, a 9×9 matrix operation.

A histogram processing unit 155 samples and counts image signal data in an input image. For example, the histogram processing unit 155 can determine whether the input image is color or monochrome and determine the level of a background of the input image.

An input-color correcting unit 156 corrects color of an input image. For example, the input-color correcting unit 156 can convert a color space of an input image into a desired color space.

The processing performed within the scanner image processing unit 150 is not limited to the above-described processing using all of the sub-scanning color misregistration correcting unit 151 to the input-color correcting unit 156. Other image processing modules may be added. Any of the above-described units may be deleted. The sequence of the processes performed by the sub-scanning color misregistration correcting unit 151 to the input-color correcting unit 156 is not limited to the above-described sequence.

The scanner image processing unit 150 of the image forming apparatus of the present embodiment includes at least one of the main-scanning color misregistration correcting unit 152, the sub-scanning color misregistration correcting unit 151, the filtering unit 154, and the input-color correcting unit 156.

Figure 6:
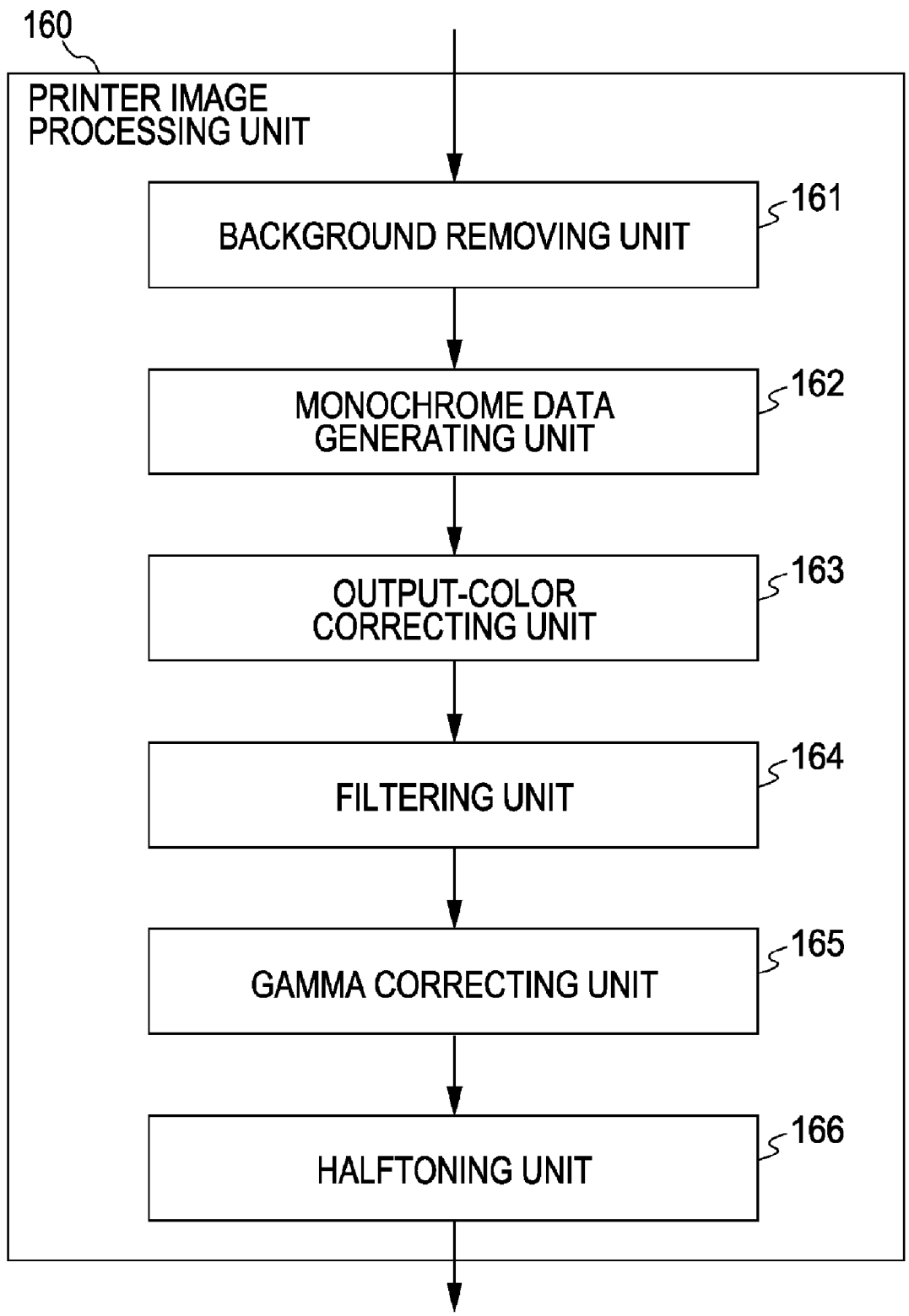
FIG. 6 is a block diagram that illustrates a detailed configuration of a printer image processing unit.

FIG. 6 is a block diagram that illustrates a detailed configuration of the printer image processing unit 160.

A background removing unit 161 removes the background color of image data, that is, removes unnecessary background fog. For example, the background removing unit 161 can perform background removal by using a 3×8 matrix operation or a one-dimensional look-up table (LUT).

A monochrome-data generating unit 162 coverts color image data to monochrome data. To print in monochrome, the monochrome-data generating unit 162 converts color image data (e.g., RGB data) to monochrome (e.g. gray) data for printing in monochrome. For example, the monochrome-data generating unit 162 can perform a 1×3 matrix operation that multiplies RGB data by a desired constant to obtain a gray signal.

An output-color correcting unit 163 corrects color in accordance with the characteristics of the printer unit 300 for outputting image data. For example, the output-color correcting unit 163 can perform a 4×8 matrix operation and/or direct mapping.

A filtering unit 164 corrects the spatial frequency of an input image to a desired value and can perform, for example, a 9×9 matrix operation.

A gamma correcting unit 165 performs gamma correction in accordance with the characteristics of the printer unit 300 for outputting image data and normally uses a one-dimensional LUT.

A halftoning unit 166 performs desired pseudo-halftoning in accordance with the number of gray levels of the printer unit 300 for outputting image data and can perform, for example, desired screening, such as binarization or 32-level gradation, and/or error diffusion.

The processing performed within the printer image processing unit 160 is not limited to the above-described processing using all of the background removing unit 161 to the halftoning unit 166. Other image processing modules may be added. Any of the above-described units may be deleted. The sequence of the processes performed by the background removing unit 161 to the halftoning unit 166 is not limited to the above-described sequence.

The image forming apparatus of the present embodiment includes the printer unit 300, and its output image processing unit includes at least one of the background removing unit 161, the monochrome-data generating unit 162, the output-color correcting unit 163, the filtering unit 164, and the halftoning unit 166.

The digital multifunction peripherals 1001 and 1002 may be a duplex document reading apparatus. An operation of reading both sides of a document will now be described below.

Figure 15:
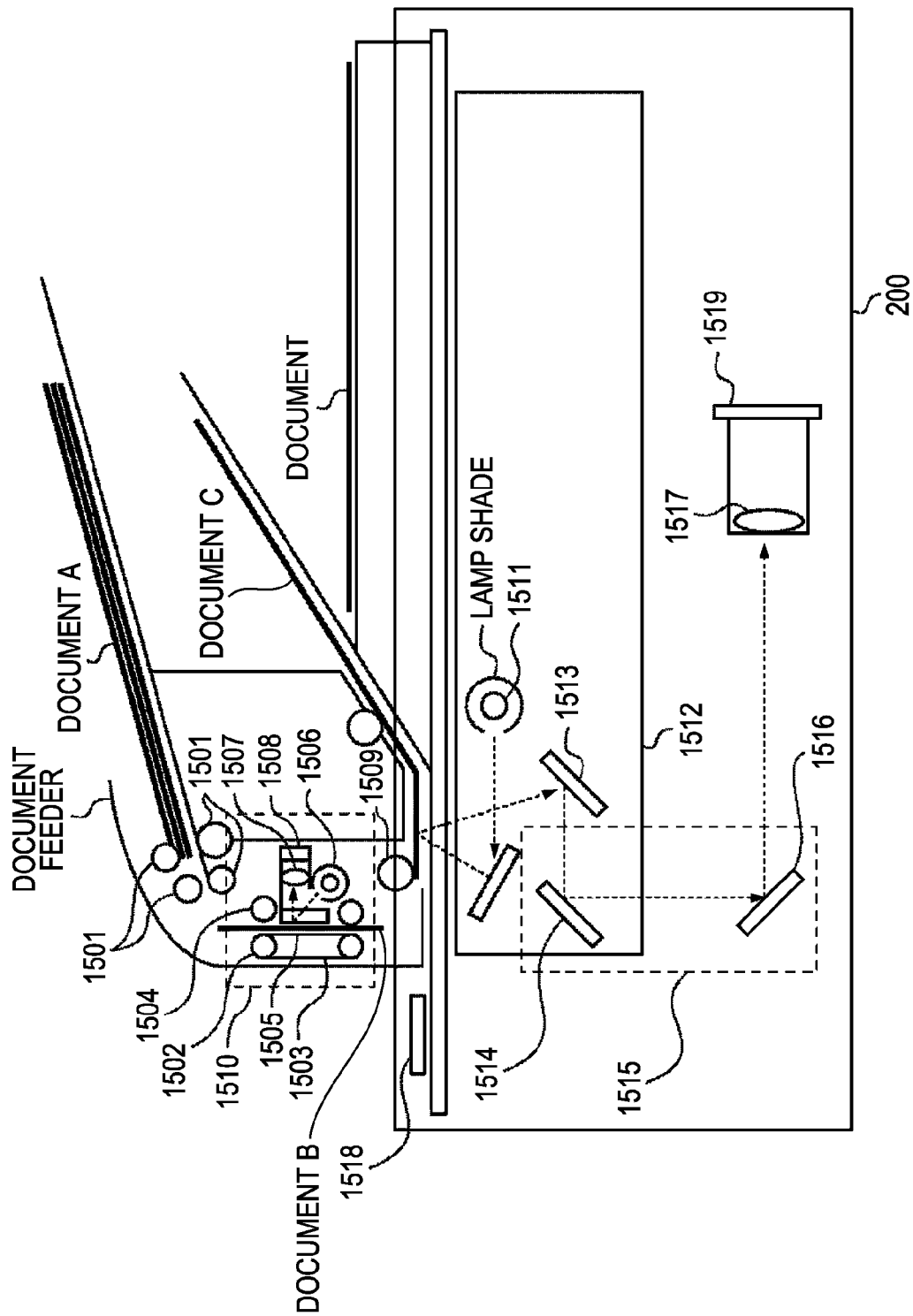
FIG. 15 illustrates a reading apparatus according to the embodiment.

FIG. 15 illustrates an exemplary duplex document reading apparatus. When a start button is pressed on a liquid crystal panel of the operating unit 400, the scanner unit 200 and a reader unit 1510 perform individual shading operations. A document at the position indicated by a document A is fed by driven rollers 1501, thus passing through the position indicated by a document B (hereinafter referred to as the position B) between a white belt 1503 driven by a roller 1502 and a facing driven roller 1504 and glass window 1505. While the document passes through the position B, the document at the position B is illuminated by an exposure lamp 1506. The reflected light passes through a lens 1507 and is photoelectrically converted into an image signal by a unity-magnification sensor 1508 including a photoelectric conversion element (e.g., a CCD). Until the document reaches a reading position of the unity-magnification sensor 1508, the unity-magnification sensor 1508 receives light reflected by the white belt 1503. On the basis of this reflected light, shading of the unity-magnification sensor 1508 is corrected. The document that has passed through the position B is conveyed to the position indicated by a document C (hereinafter referred to as the position C) by a driven conveyance roller 1509. During this, light from an exposure lamp 1511 in a running system 1512 of the scanner unit 200 is reflected by the document at the position C, and the reflected light is reflected by a second mirror 1513, a first mirror 1514, and a third mirror 1516 in a running system 1515. The light is converged by a lens 1517 and photoelecrically converted by a CCD 1519. In the above-described operation, the running systems 1512 and 1515 do not run and stay at a fixed place. However, the running systems 1512 and 1515 move up to a position for reading a white plate 1518 before the document reaches the position C, and shading correction is performed.

Processing of correcting the color difference between the front and back sides of a document in duplex reading will now be described below with reference to a flowchart shown in FIG. 8. The processing described in the flowchart of FIG. 8 is performed by the CPU 103. An operator can start the processing of correcting the color difference between the front and back sides of a document in duplex reading by calling up a color-difference correction menu on the liquid crystal panel of the operating unit 400.

Outputting Color-Difference Correction Chart (S801)

To correct the color difference between the front and back sides of a document in duplex reading, a density gradation chart dedicated to reading by a scanner (hereinafter referred to as a color-difference correction chart) is generated and output. For the color-difference correction chart, a gradation chart for general color matching for the color gamut is different from that for local color matching for a specific color. In the case of general color matching, the color difference between the front and back sides is evenly corrected by use of a chart that covers the color gamut belonging to an apparatus. In contrast, to perform high-accuracy color matching on a specific color, correction accuracy can be enhanced by use of a chart that contains many samples corresponding to a desired color and adjacent color. The processing of outputting a color-difference correction chart (S801) includes a plurality of steps. The details will be described later.

Step of Reading Chart by Front-Side Scanner (S802)

Figure 7A:
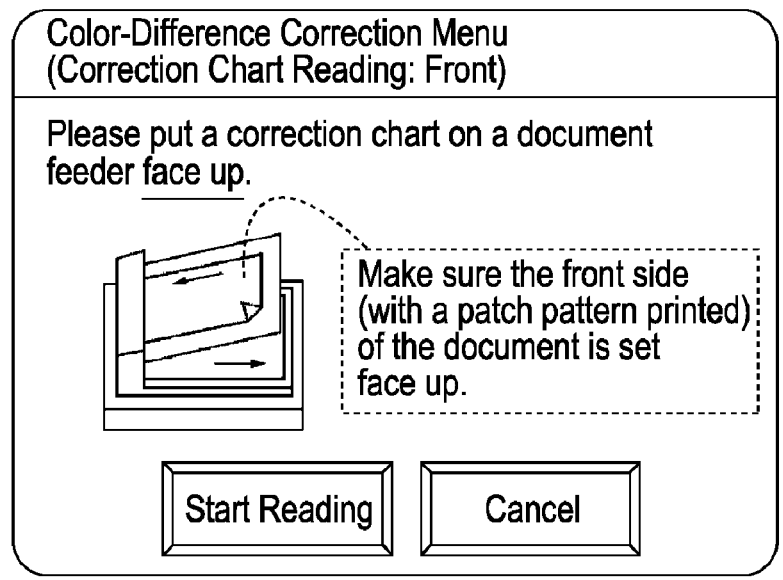
FIGS. 7A and 7B illustrate screens displayed before a correction sheet is read.

The color-difference correction chart output in the processing of outputting a color-difference correction chart (S801) is set on the tray 202 of the document feeder 201. At this time, to show how the chart should be placed on the tray 202, a screen that provides guidance on the side and orientation to be set illustrated in FIG. 7A appears on the liquid crystal panel of the operating unit 400. Clearly showing how the chart should be placed can prevent incorrect operation carried out by an operator. The operator can initiate reading of image information (image reading) of the front side of the document using the front-side scanner by pressing the "Start Reading" button after placing the color-difference correction chart on the tray 202.

Step of Obtaining Value Read by Front-Side Scanner (S803)

Values (R', G', B') read by the front-side scanner are transmitted from the scanner unit 200 to the scanner image processing unit 150 via the scanner interface 113 and are subjected to appropriate correction if needed and, additionally, color-difference correction. The color-difference correction according to the present embodiment is performed in the input-color correcting unit 156 of the scanner image processing unit 150. When the color-difference correction chart is generated in consideration of non-uniformity of sensor read values and variations in the in-plane density, it is necessary to calculate the mean value from calorimetric values for patches. The same method for calculating the mean value for patches is not necessarily used every time because the structure of patches is different between general color-difference correction and specific-color color-difference correction. Accordingly, it is necessary to appropriately vary the calculation method in response to the result of the processing of outputting a color-difference correction chart.

Step of Reading Chart by Back-Side Scanner (S804)

Figure 7B:
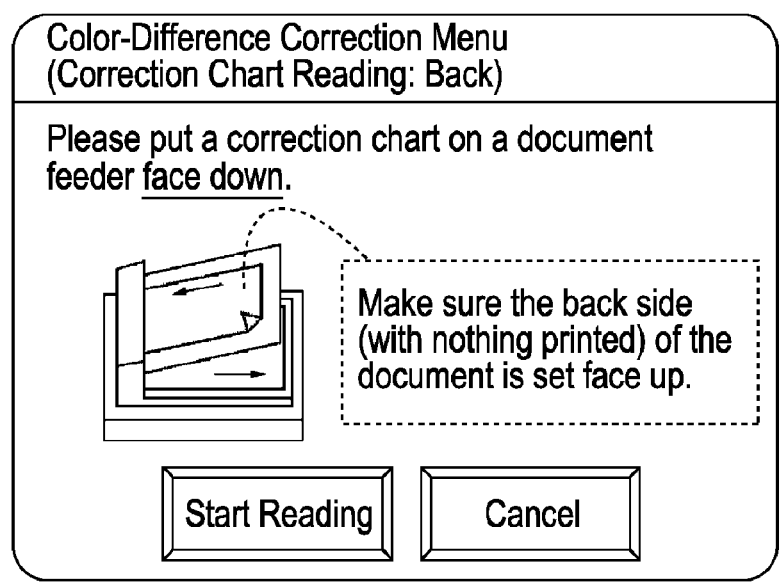

Similarly, by use of the color-difference correction chart previously read by the front-side scanner, the chart is read by the back-side scanner. Also at this time, as in the case of the front side, to show how the chart should be placed on the tray 202, a screen that provides guidance on the side and orientation to be set illustrated in FIG. 7B appears on the liquid crystal panel of the operating unit 400. Clearly showing how the chart should be placed can prevent incorrect operation carried out by an operator. The operator can initiate reading of image information (image reading) of the back side of the document using the back-side scanner by pressing the "Start Reading" button after placing the color-difference correction chart on the tray 202.

Step of Obtaining Value Read by Back-Side Scanner (S805)

Values (R, G, B) read by the back-side scanner are transmitted from the scanner unit 200 to the scanner image processing unit 150 via the scanner interface 113, as in the case of the front side, and are subjected to appropriate correction if needed and, additionally, the color-difference correction according to the present embodiment. The color-difference correction according to the present embodiment is performed in the input-color correcting unit 156 of the scanner image processing unit 150. The method for calculating the mean value for patches and other characteristics are substantially the same as in the case of the front side.

Step of Generating Correction Matrix J (S806)

By use of the read values for the front and back sides transmitted to the scanner image processing unit 150, regression analysis is performed such that the read values for the back side (R, G, B) approach the read values for the front side (R', G', B') to generate a correction matrix J.

In step S806, a 3×3 correction matrix J represented by the following Expression (1) is generated from the read values for the back side.

$$J = \begin{bmatrix} j_{11} & j_{12} & j_{13} \\ j_{21} & j_{22} & j_{23} \\ j_{31} & j_{32} & j_{33} \end{bmatrix} \quad (1)$$

Elements in this matrix are calculated by the following expressions, where m represents the total number of patches:

$$j_{11} = \sum_{n=1}^{m} (R_n \times R_n) \quad j_{12} = \sum_{n=1}^{m} (G_n \times R_n) \quad j_{13} = \sum_{n=1}^{m} (B_n \times R_n) \quad (2)$$

$$j_{21} = \sum_{n=1}^{m} (R_n \times G_n) \quad j_{22} = \sum_{n=1}^{m} (G_n \times G_n) \quad j_{23} = \sum_{n=1}^{m} (B_n \times G_n)$$

$$j_{31} = \sum_{n=1}^{m} (R_n \times B_n) \quad j_{32} = \sum_{n=1}^{m} (G_n \times B_n) \quad j_{33} = \sum_{n=1}^{m} (B_n \times B_n)$$

Step of Generating Correction Matrix K (S807)

From the read values for the back side (R, G, B) and the read values for the front side (R', G', B'), a correction matrix K represented by the following Expression (3) is generated.

$$K = \begin{bmatrix} k_{11} & k_{12} & k_{13} \\ k_{21} & k_{22} & k_{23} \\ k_{31} & k_{32} & k_{33} \end{bmatrix} \quad (3)$$

Elements in this matrix are calculated by the following expressions, where m represents the total number of patches:

$$k_{11} = \sum_{n=1}^{m} (R_n \times R'_n) \quad k_{12} = \sum_{n=1}^{m} (G_n \times R'_n) \quad k_{13} = \sum_{n=1}^{m} (B_n \times R'_n) \quad (4)$$

$$k_{21} = \sum_{n=1}^{m} (R_n \times G'_n) \quad k_{22} = \sum_{n=1}^{m} (G_n \times G'_n) \quad k_{23} = \sum_{n=1}^{m} (B_n \times G'_n)$$

-continued $$k_{31} = \sum_{n=1}^{m} (R_n \times B'_n) \quad k_{32} = \sum_{n=1}^{m} (G_n \times B'_n) \quad k_{33} = \sum_{n=1}^{m} (B_n \times B'_n)$$

Step of Calculating Correction Matrix M for Color Difference Between Front and Back Sides (S808)

By use of the generated correction matrices J and K, a 3×3 correction matrix M for the color difference between the front and back sides represented by the following Expression (5) is calculated.

$$M = K \times J^{-1} \quad (5)$$

In this step, an inverse matrix of the correction matrix J is calculated. Until a matrix that has the format for final register setting is calculated, floating-point arithmetic is performed. In such a manner, the processing of correcting a color difference between the front and back sides is completed.

The processing of outputting a color-difference correction chart will now be described below. In general, the correction accuracy of a technique for correcting a read value using regression analysis, typified by the present embodiment, increases with an increase in the number of samples.

However, the paper size and shape of a chart to be read by a scanner is normally fixed at a predetermined size, for example, A3 size. As a result, an approach to increasing the number of samples is limited to devising the structure of the chart itself by, for example, increasing the number of charts to be read, minimizing the size of a patch in a predetermined paper size, or changing a signal value for each patch.

With regard to this point, the present embodiment is based on the premise that the chart is devised without an increase in the number of charts to be read. That is, the present embodiment provides easy correction concerning image signals obtained from the same document read by two reading sensors without increasing work load on an operator.

Figure 10:
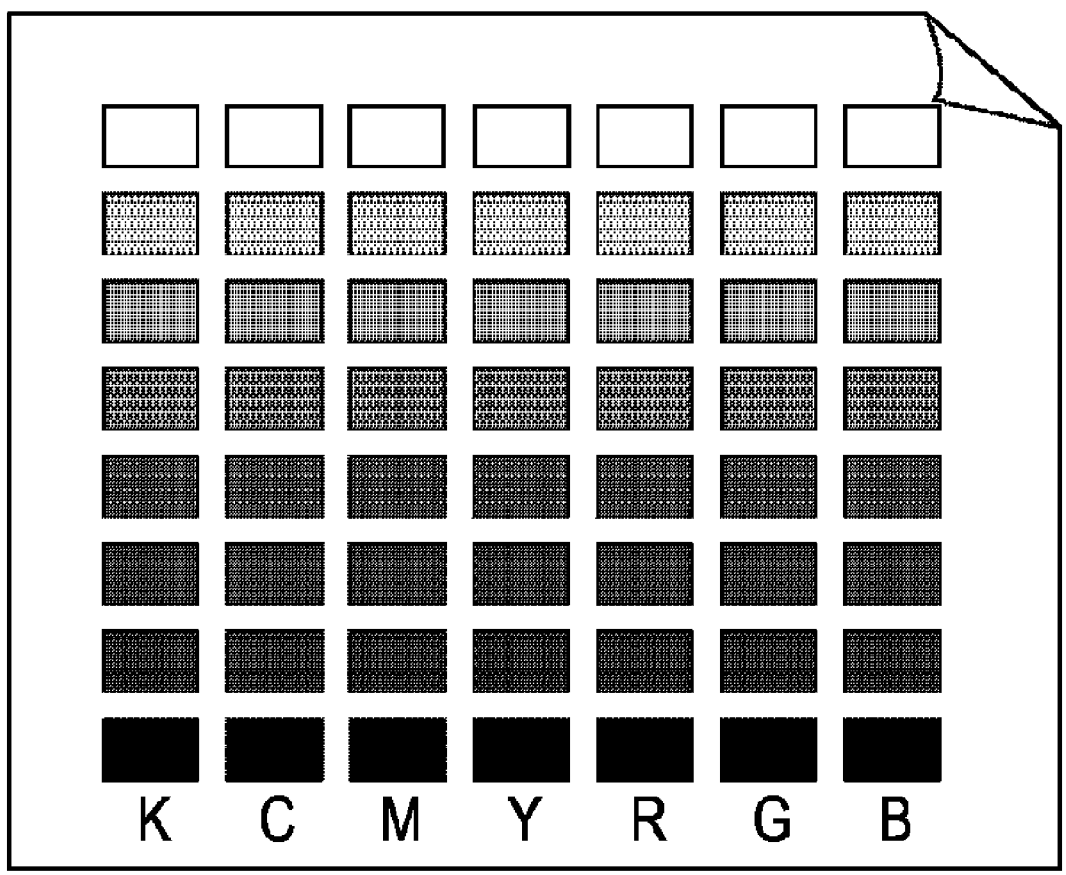
FIG. 10 illustrates an example of a general color-difference correction chart.

As previously described, the color-difference correction chart for use in general color matching for the color gamut is different from that for use in local color matching for a specific color. In the case of general color matching, the color difference between the front and back sides can be evenly corrected over the color gamut by use of a chart that covers the color gamut belonging to an apparatus. Color-difference correction for general color matching without selection of a specific color is referred to as general color-difference correction, and a color-difference correction chart for use in the general color-difference correction is referred to as a general color-difference correction chart. One such example of the general color-difference correction chart is illustrated in FIG. 10. A color-difference correction chart for use in general color matching illustrated in FIG. 10 contains a plurality of density gradation patterns individually corresponding to colors, which are black (K), cyan (C), magenta (M), yellow (Y), red (R), green (G), and blue (B), formed on a sheet. The use of such a chart enables color-difference correction to be evenly performed on the color gamut.

In contrast, to perform high-accuracy color matching on a specific color of, for example, a logo, the use of a chart that contains many patches in patch patterns for a desired specific color and its adjacent color can enhance correction accuracy. Accordingly, for this case, it is necessary to prepare a chart to which a weight is assigned to a specific color, not a chart that covers the color gamut, as illustrated in FIG. 10.

Figure 9:
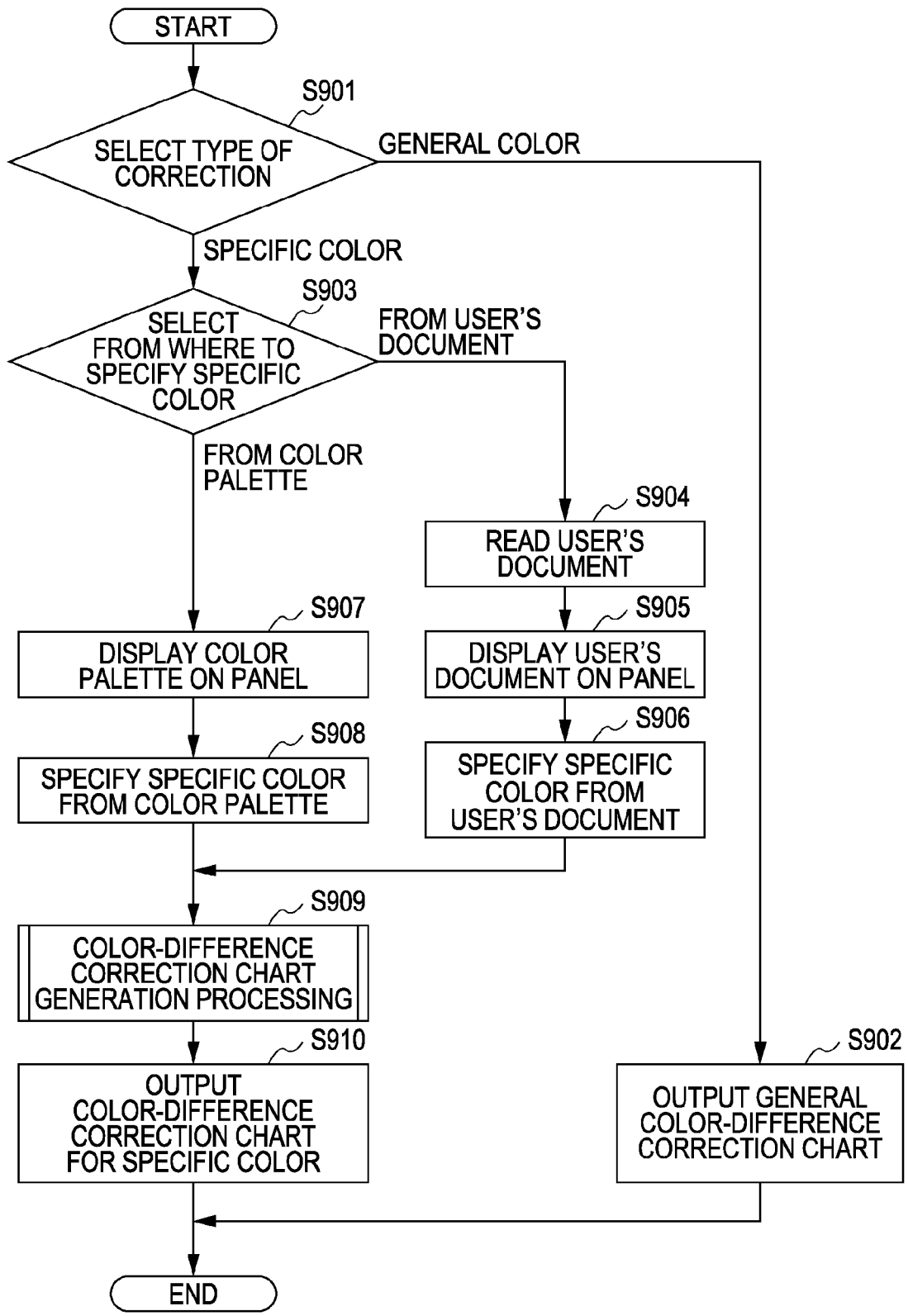
FIG. 9 is a flowchart of a process for outputting a color-difference correction chart.

FIG. 9 shows a flowchart of the processing of outputting a color-difference correction chart including determining whether to perform general color-difference correction or color-difference correction for a specific color desired by an operator and generating an appropriate color-difference correction chart.

The processing of outputting a color-difference correction chart illustrated in FIG. 8 (S801) will now be described below with reference to a flowchart of FIG. 9. An operator can start the processing of correcting a color difference between the front and back sides of a document in duplex reading by calling up a color-difference correction menu on the liquid crystal panel of the operating unit 400. Because the processing of outputting a color-difference correction chart is positioned at the first step of the processing of correcting a color difference, activation of the color-difference correction menu launches the processing of outputting a color-difference correction chart. In the processing of outputting a color-difference correction chart, first, in step S901 of selecting the type of color-difference correction, it is determined whether general color-difference correction or color-difference correction for a specific color is to be performed. In step S901 of selecting the type of color-difference correction and step S903 of selecting from where to specify a specific color, which will be described later, are set according to a menu displayed on the liquid crystal panel of the operating unit 400 (not shown).

In step S901 of selecting the type of color-difference correction, if the operator selects general color-difference correction, flow proceeds to step S902 of outputting a general color-difference correction chart, where a general color-difference correction chart illustrated in FIG. 10 is output. Then, the operator places the output color-difference correction chart on the tray 202 of the document feeder 201 and starts a reading operation, and flow then proceeds to step S802 of reading a chart by the front-side scanner.

In step S901 of selecting the type of color-difference correction, if the operator selects color-difference correction for a specific color, flow proceeds to step S903 of selecting from where to specify a specific color. In step S903 of selecting from where to specify a specific color, it is determined whether the specific color is to be specified from a predetermined color palette (color sample) or concrete colors used in a user's document, such as presentation material.

Figure 11A:
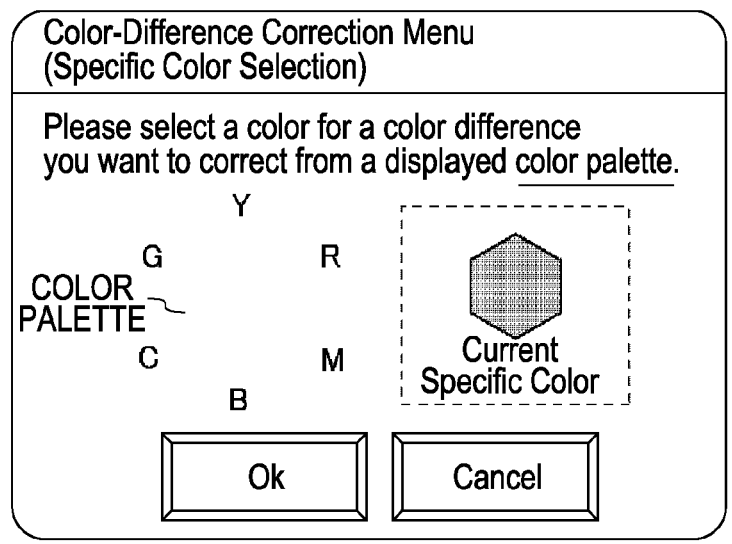
FIGS. 11A to 11C illustrate screens displayed before a specific color is specified.

In step S903 of selecting from where to specify a specific color, if the operator selects "from a color palette", the operator can specify a specific color to be corrected from a predetermined color palette. In step S907, a specific-color selection menu, as illustrated in FIG. 11A, is displayed on the liquid crystal panel of the operating unit 400. In step S908, the operator specifies a desired specific color to be corrected from the displayed color palette (color sample) illustrated in FIG. 11A by pointing to the color using, for example, a touch-sensitive pen. In FIG. 11A, a single currently selected specific color is displayed. However, a plurality of specific colors may be specified from the color palette. In this case, specified specific colors are concurrently corrected.

Then, in step S909, a color-difference correction chart that has a higher proportion of the specific color and its adjacent colors (which can be referred to as a specific-color color-difference correction chart) is generated on the basis of the specific color specified in step S908. For example, when red is selected as the specific color, a color-difference correction chart in which 28 patches are assigned to red, dark red, and bright red in a total of 56 patches is generated. The processing of generating a color-difference correction chart (S909) includes a plurality of steps. The details will be described later.

In step S910 of outputting a color-difference correction chart for a specific color, the specific-color color-difference correction chart generated in step S909 is output. Then, the operator places the output color-difference correction chart on the tray 202 of the document feeder 201 and starts a reading operation, and flow then proceeds to step S802 of reading a chart by the front-side scanner.

Figure 11B:
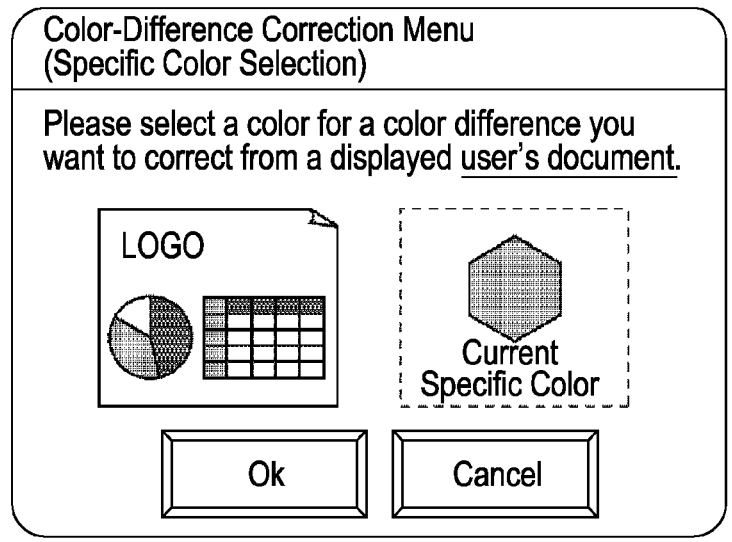

A case will now be described below in which, in step S903 of selecting from where to specify a specific color, the operator selects "from a user's document". In this case, the operator can specify a specific color to be corrected from a prepared user's document. In step S904, the operator places the prepared user's document on the tray 202 of the document feeder 201 and then starts a reading operation. In step S905, the read user's document is subjected to appropriate correction, such as being zoomed, and then is displayed on the liquid crystal panel of the operating unit 400 as a specific-color selection menu. One example of the specific-color selection menu is illustrated in FIG. 11B. In step S906, the operator specifies a desired specific color to be corrected by pointing to the color using, for example, a touch-sensitive pen. In FIG. 11B, a single currently selected specific color is displayed. However, a plurality of specific colors may be specified from a user's document. In this case, specified specific colors are concurrently corrected. In step S903, the operator may select specifying of a specific region. In this case, a color largely contained in the specific region is determined as the specific color. If a plurality of colors is contained in the specific region, a plurality of specific colors may be specified.

In FIG. 11B, which shows an example of the specific-color selection menu displayed on the panel, the operator may select a specific color from among a displayed original color palette including a plurality of representative colors picked up from the user's document. Alternatively, a specific color may be automatically specified from among representative colors picked up. Any method of specifying a specific color may be used as long as a color desired by the operator is identified. A method having a reduced number of actions can be used, resulting in suppression of the occurrence of operation error.

Figure 11C:
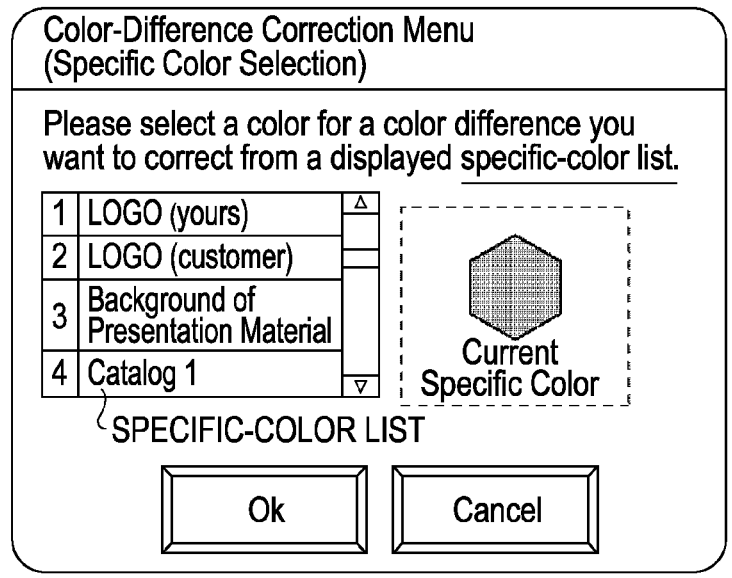

Another method for specifying a specific color is to retain a signal value of a specific color specified from a user's document and display a history of specified specific colors as a specific-color list in the menu. FIG. 11C illustrates an example of a history of specific colors displayed on the liquid crystal panel of the operating unit 400. If color-difference correction was performed using the same type of user's document, the operator merely specifies a desired specific color from a specific-color list that indicates history information. This saves time and effort for operation.

In step S906 of specifying a specific color from a user's document, if the specific color is specified through the operating unit 400, the specified specific color and information on the specified coordinates are provided to the next step S909 of generating a color-difference correction chart. In this case, in step S909 of generating a color-difference correction chart, a new color-difference correction chart is generated based on the specified specific color and the coordinate information. The details of the processing of generating a color-difference correction chart (S909) will be described later.

In step S910 of outputting a color-difference correction chart for a specific color, the specific-color color-difference correction chart is output. Then, the operator places the output color-difference correction chart on the tray 202 of the document feeder 201 and starts a reading operation, and flow then proceeds to step S802 of reading a chart by the front-side scanner.

Figure 12:
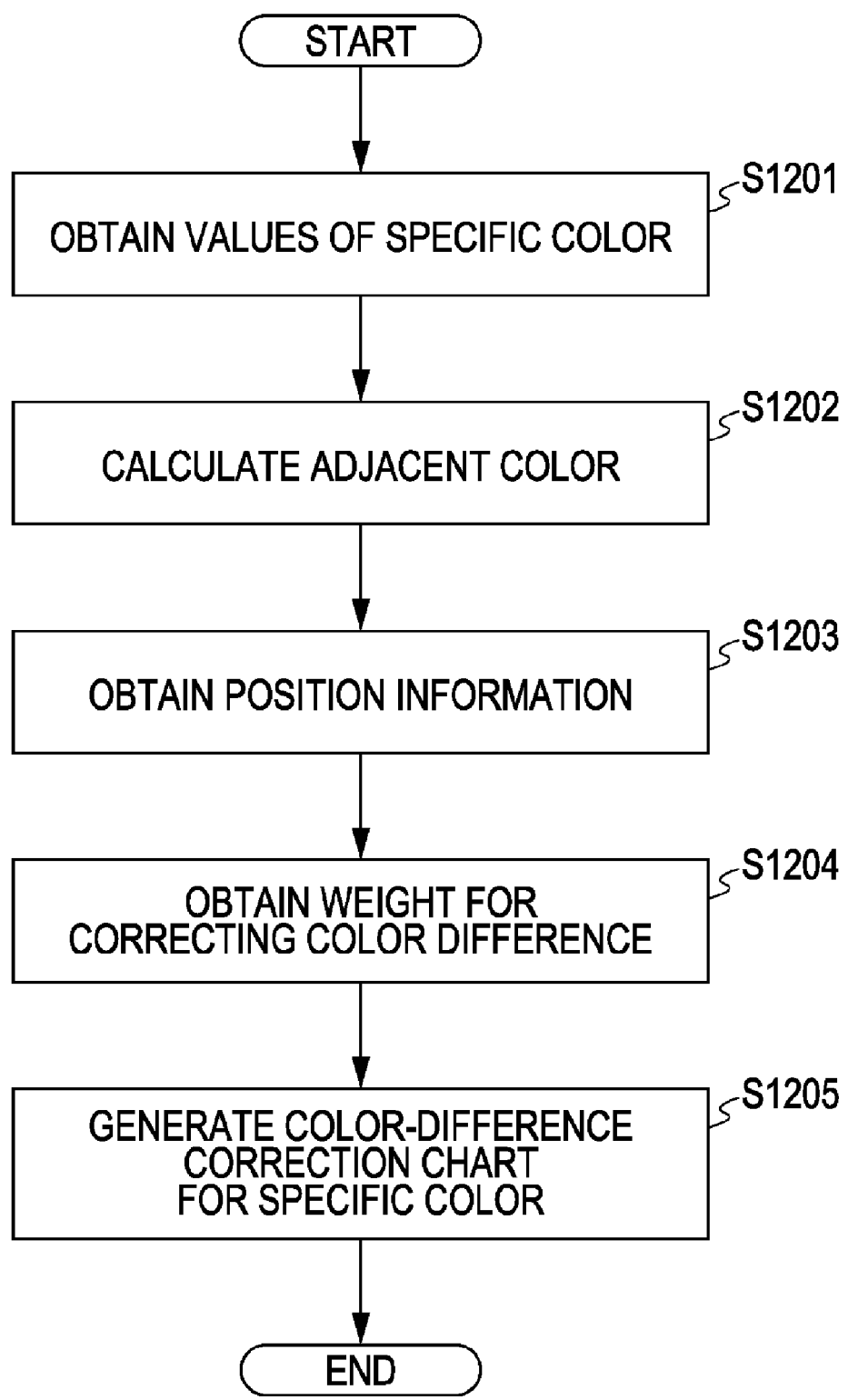
FIG. 12 is a flowchart of a process for generating a color-difference correction chart.

The details of the processing of generating a color-difference correction chart (S909) will now be described with reference to a flowchart illustrated in FIG. 12. First, in step S1201 of obtaining a specific color, values (R, G, B) of the specific color specified in step S908 of specifying a specific color from a color palette or in step S906 of specifying a specific color from a user's document are obtained.

Subsequently, in step S1202 of calculating an adjacent color, a color adjacent to the specific color is calculated. To reduce reading error of a sensor occurring when a user's document is read using a scanner, a color-difference correction chart for a specific color contains both a patch pattern for a specific color and a patch pattern for its adjacent color. One example of a method for calculating an adjacent color is to calculate, as an adjacent color, a color within a predetermined color-difference range from the specific color on a uniform color space, such as a Lab color space. When the values (R, G, B) for the specific color are in a device color space of an output device, such as a printer, an adjacent color can be determined by substituting an integer equal to or more than one into each of l, m, and n of (R±l, G±m, B±n).

Figure 13:
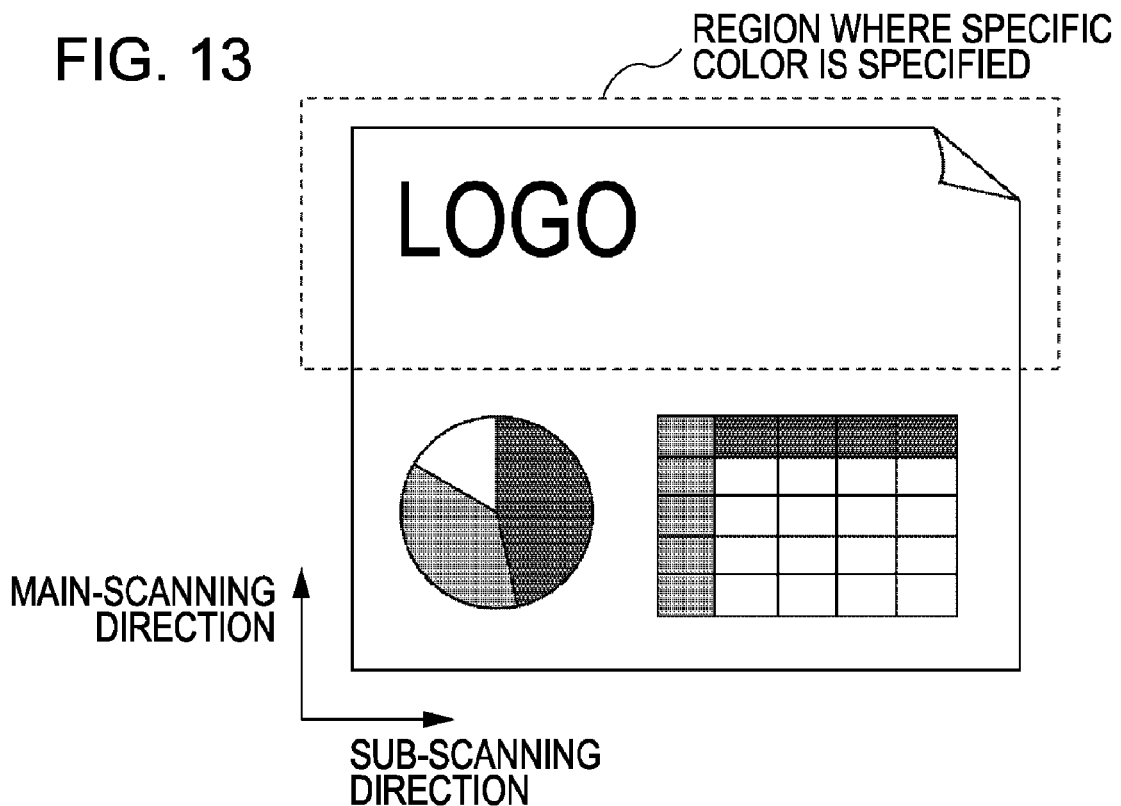
FIG. 13 illustrates an enlarged view of a portion where a user's document is displayed.

In step S1203 of obtaining position information, position information for the specific color is obtained. The position information for the specific color is specified simultaneously with when the specific color is specified in step S908 of specifying a specific color from a color palette or in step S906 of specifying a specific color from a user's document. One example of when the operator specifies a specific color in step S906 of specifying a specific color from a user's document is described with reference to FIG. 13, which shows an enlarged view of a portion that displays a user's document in FIG. 11B. First, the operator specifies, as a specific color, letters of "LOGO" on the upper-left part in the user's document illustrated in FIG. 13 using, for example, a touch-sensitive pen. At this time, the color of letters of "LOGO" is obtained as a specific color in step S1201 of obtaining a specific color. A region surrounded by broken lines in FIG. 13 is obtained as a specific-color specifying region in step S1203 of obtaining position information.

In the present embodiment, color-difference correction is performed in consideration of non-uniformity of read values in reading by a scanner and variations in the in-plane density caused by an output device in outputting a chart.

Noticeable in-plane color variations resulting from an electrophotographic image forming process will now be described. A typical electrophotographic image forming apparatus used as a copier or printer uniformly charges a photosensitive-body layer, then exposes an image portion using an optical scanning unit, and electrostatically attaching charged toner to the photosensitive body by a developing unit to form a toner image. The photosensitive-body layer may have variations in charging characteristics and luminous sensitivity, depending on the two-dimensional position of the formed layer. As a result, even when uniform charging, exposing and developing have been made, the density may vary depending on the two-dimensional position.

Other image forming methods for printing, forming a film photograph, inkjet printing, and thermal transfer printing have significantly small variations in the in-plane density, so this is less prone to causing visual problems. However, variations in the density in electrophotography may be on the order of 3 to 6 in terms of in-plane mean color difference, and this is prone to causing a visual problem. In particular, because granularity is significantly improved due to size reduction in toner particles and the advance of technology of development, transfer, and fixation, variations in the density becomes more easily sensed.

In-plane variations in charging characteristics and luminous sensitivity of the photosensitive body are mainly caused by a matter of a method of producing the photosensitive body and the structural reason. Typically, the photosensitive body is produced by application of an organic photosensitive material to a pipe or belt made of a conductive material, such as aluminum. The film thickness of the applied photosensitive material is significantly small at several tens of micrometers. This film thickness largely affects the charging characteristics and luminous sensitivity of the photosensitive body, so it is necessary to make the film thickness uniform. To this end, applying the photosensitive material with high precision on the order of micrometers is required. This results in an increase in the cost of manufacturing the photosensitive body, and this is impractical.

In addition, it is difficult to uniformly charge, expose, and develop the photosensitive body. If an optical scanning unit that has a plurality of light-emitting elements arranged in the main-scanning direction, such as an LED image bar, is used for exposure, the light-emitting elements have variations in the emission intensity, resulting in variations in the potential on the photosensitive body. In development, if the distance between the photosensitive body and a development roller having a thin developer layer formed on its peripheral surface is not uniform, the quantity of toner applied from the development roller to the photosensitive body varies, thus resulting in variations in the density of development. Because the distance between the development roller and the photosensitive body is typically on the order of several hundreds of micrometers, a frame for fixing the developing unit and the photosensitive body is required to have high mechanical accuracy and rigidity to avoid the above-described problems. This causes an increase in the cost of manufacturing the image forming apparatus and in the size thereof.

As described above, in electrophotographic image forming apparatuses, a main cause of in-plane color variations lies in image forming processes of charging, exposing, developing, and transferring. Therefore, color variations occur in an image on a sheet as composite color variations resulting from the image forming processes, depending on the in-plane two-dimensional position.

In the present embodiment, in consideration of variations in the in-plane density caused by at least one of the above-described reasons, position information on a position where a specific color was specified is obtained, and a patch pattern for the specific color is generated in the vicinity of the position where the specific color was specified. Because normal non-uniformity in the density occurs in the main-scanning direction, in the present embodiment, an upper half portion of the sheet is set as a region where a specific color is specified, as illustrated in FIG. 13. When a device that has no non-uniformity of read values and variations in the density is used, such position information is not necessarily required. The region where a specific color is specified may be obtained more finely by, for example, dividing a sheet into four parts or using coordinates of pixels in specifying a specific color.

In step S1204 of obtaining a weight for correcting a color difference, a weight input by an operator according to a menu (not shown) displayed on the operating unit 400 or a predetermined weight is obtained. The weight for correcting a color difference is provided to the next step S1205.

Finally, in step S1205 of generating a color-difference correction chart for a specific color, a color-difference correction chart for a specific color is generated. The specific-color color-difference correction chart is generated in consideration of the values obtained in the above-described steps, i.e., the specific color, the adjacent color, the position information, and the weight for correcting the color difference. More specifically, first, the number of patches in a patch pattern for the specific color, a patch pattern for the adjacent color, and a patch pattern for general colors are generated from the value of a corresponding weight. With an increase in the magnification of the value of weight, the number of patches in the patch pattern for the specific color and that for the adjacent color increase and the number of patches in the patch pattern for general colors reduces. In contrast, with a reduction in the magnification of the value of weight, the number of patches in the patch pattern for the specific color and that for the adjacent color reduce and the number of patches in the patch pattern for general colors increases. When the value of the weight is large, which means that a small number is assigned to the number of patches in the patch pattern for general colors, patches in the patch pattern for general colors are reduced to the assigned number. To correct a color difference to a specific color with high accuracy, it is necessary to increase the value of the weight.

Then, the patch patterns are arranged based on the position information. That is, the patch pattern for the specific color and the patch pattern for the adjacent color are arranged in the region where the specific color is specified, and the patch pattern for general colors having a reduced number of patches is arranged in the other region.

Figure 14:
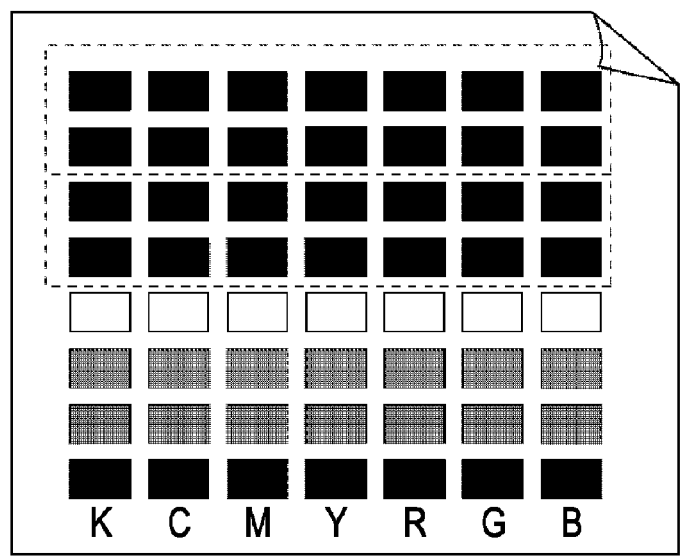
FIG. 14 illustrates an example of a color-difference correction chart for a specific color.

FIG. 14 illustrates an example of a color-difference correction chart for a specific color. The patch pattern for the specific color and the patch pattern for the adjacent color are arranged in the region where the specific color is specified obtained in step S1203 of obtaining position information. For example, when the operator specifies, as a specific color, the color of letters of "LOGO" in an upper left portion on the user's document illustrated in FIG. 13 using, for example, a touch-sensitive pen, position information indicating a region surrounded by broken lines in FIG. 13 as a region where the specific color is specified is obtained in step S1203 of obtaining position information.

In FIG. 14, the weight for correcting the color difference specified in step S1204 is a weight that enables the sum of the number of patches in the patch pattern for the specific color and that for the adjacent color to be equal to the number of patches in the patch pattern for general colors. Each of the place of the patch pattern for the specific color and the place of the patch pattern for the adjacent color is shown in an area surrounded by broken lines in FIG. 14.

To further enhance advantageous effects of correction on a specific color, the sum of the number of patches in the patch pattern for the specific color and that for the adjacent color is made to be larger than that in FIG. 14, which means that the number of patches in the patch pattern for general colors is reduced.

In contrast, to further decrease advantageous effects of correction on a specific color, the sum of the number of patches in the patch pattern for the specific color and that for the adjacent color is made to be smaller than that in FIG. 14, which means that the number of patches in the patch pattern for general colors is increased. In the present embodiment, only the patch pattern for the specific color and the patch pattern for general colors may be generated without generation of the patch pattern for the adjacent color.

The number of patches in each of the patch patterns for a specific color, an adjacent color, and general colors may be automatically adjusted in accordance with human visual features. In general, sensitivity to achromatic colors and adjacent colors is high, and sensitivity to a color in a high color saturation area is low. Utilizing these features, if the specific color is in an area for achromatic colors, the number of patches in the patch pattern for the specific color and that for the adjacent color may be increased; if the specific color is in a high color saturation area, the number of patches in the patch pattern for general colors may be increased. This eliminates the necessity of inputting the weight in step S1204 of obtaining a weight for correcting a color difference, thus reducing the number of actions performed by the operator.

As described above, the image forming apparatus according to the present embodiment allows, when an operator wants to correct a color difference to a more local color, the operator to specify a desired specific color from a display panel. By generating a correction chart in which a weight is assigned to a specific color on the basis of information on the specified specific color, causing a reading device to read the correction chart, performing regression analysis such that the read values for the back side of the chart approaches the read values for the front side of the chart, and calculating a correction matrix, the values for read signals for the front and back sides of a duplex document for the specific color in reading the document can approach each other with high accuracy.

A suitable example is outputting a presentation material whose both sides have been printed in 2 in 1 mode (two pages are printed onto one page). To output a material such that an important company logo and a high-impact background are represented by significantly unified colors, the read signal values for the front and back sides can approach each other with high accuracy in the image forming apparatus according to the present embodiment. This results in minimization of the color difference in outputting.

In the image forming apparatus according to the present embodiment, when the operator specifies a specific color on a display panel, its position information can be obtained and the arrangement of patch patterns in a correction chart can be changed. Therefore, the influence of non-uniformity of values read by a scanner and variations in the in-plane density caused by an output device for outputting a generated correction chart is small, so high-accuracy correction can be performed.

Other Embodiments

The above-described embodiment can also be achieved by supplying a storage medium (recording medium) that stores software (program) realizing the above-described functions to a system or an apparatus and causing a computer (or a CPU or microprocessor unit (MPU)) in the system or the apparatus to execute the software. In this case, the software itself read from the storage medium realizes the functions of the above-described embodiment, so the storage medium that stores the software is included in the present invention.

In addition to execution of the software to realize the functions, performance of actual processing in part or in entirety by an operating system (OS) running on a computer in accordance with instructions of the software to realize the above-described functions is also included.

Writing the software in a function expansion card or unit connected to a computer and executing actual processing in part or in entirety by a CPU of the card or unit in accordance with instructions of the software to realize the above-described functions is included.

For applying the present invention to the above-described storage medium, the storage medium stores software corresponding to the flowcharts previously described.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures and functions.

This application claims the benefit of Japanese Application No. 2007-019474 filed Jan. 30, 2007, which is hereby incorporated by reference herein in its entirety.

What is claimed is:

1. An image processing apparatus comprising:
   a first image reading unit configured to read image information of a front side of a document as an image signal;
   a second image reading unit configured to read image information of a back side of the document as an image signal;
   a specific-color specifying unit configured to specify a specific color by inputting an instruction at a specific position on the document;
   an outputting unit configured to generate and output a patch pattern that contains a first number of patches corresponding to color adjacent to the specified specific color and a second number of patches corresponding to color other than the color adjacent to the specified specific color, the first number of patches being larger than the second number of patches; and
   a color-difference correcting unit configured to correct a color difference between the image signal read by the first reading unit and the image signal read by the second reading unit based on a first image signal obtained by reading of the patch pattern performed by the first image reading unit and a second image signal obtained by reading of the patch pattern performed by the second image reading unit,
   wherein the outputting unit is configured to output the patch pattern corresponding to the color adjacent to the specific color in vicinity of a position corresponding to the position instructed by the specific-color specifying unit on the document.

2. The image processing apparatus according to claim 1, further comprising a weight specifying unit configured to specify a weight for the specific color,
   wherein the first number of patches corresponding to the color adjacent to the specified specific color in the patch pattern generated by the outputting unit increases with an increase in the weight specified by the weight specifying unit.

3. The image processing apparatus according to claim 1, wherein the specific-color specifying unit is configured to specify the specific color from a predetermined color palette.

4. The image processing apparatus according to claim 1, wherein the specific-color specifying unit is configured to specify the specific color from the image signal obtained by the first image reading unit or the second image reading unit.

5. The image processing apparatus according to claim 1, wherein the specific-color specifying unit is configured to specify the specific color in response to a user's selection using history information about the specified specific color.

6. An image processing method comprising:
   reading image information of a front side of a document as an image signal;
   reading image information of a back side of the document as an image signal;
   specifying a specific color by inputting an instruction at a specific position on the document;
   generating and outputting a patch pattern that contains a first number of patches corresponding to color adjacent to the specified specific color and a second number of patches corresponding to color other than the color adjacent to the specified specific color, the first number of patches being larger than the second number of patches; and
   correcting a color difference between the image signal read in reading image information of the front side and the image signal read in reading image information of the back side based on a first image signal obtained by reading of the patch pattern performed in reading image information of the front side and a second image signal obtained by reading of the patch pattern performed in reading image information of the back side,
   wherein, in generating and outputting the patch pattern, the patch pattern corresponding to the color adjacent to the specific color is generated and output in vicinity of a position corresponding to the position instructed on the document.

7. A non-transitory computer-readable storage medium that stores a control program that causes a computer to execute an image processing method for use in an image processing apparatus, the image processing method comprising:
   reading image information of a front side of a document as an image signal;
   reading image information of a back side of the document as an image signal;
   specifying a specific color by inputting an instruction at a specific position on the document;
   generating and outputting a patch pattern that contains a first number of patches corresponding to color adjacent to the specified specific color and a second number of patches corresponding to color other than the color adjacent to the specified specific color, the first number of patches being larger than the second number of patches; and
   correcting a color difference between the image signal read in reading image information of the front side and the image signal read in reading image information of the back side based on a first image signal obtained by reading of the patch pattern performed in reading image information of the front side and a second image signal obtained by reading of the patch pattern performed in reading image information of the back side,
   wherein, in generating and outputting the patch pattern, the patch pattern corresponding to the color adjacent to the specific color is generated and output in vicinity of a position corresponding to the position instructed on the document.

8. An image processing apparatus comprising:
   a specific-color specifying unit configured to specify a specific color by inputting an instruction at a specific position on the document;
   an outputting unit configured to generate and output a patch pattern that contains a first number of patches corresponding to color adjacent to the specified specific color and a second number of patches corresponding to color other than the color adjacent to the specified specific color, the first number of patches being larger than the second number of patches; and
   a color-difference correcting unit configured to correct a color difference between an image signal read by a first reading unit and an image signal read by a second reading unit based on a first image signal obtained by reading of the patch pattern performed by the first image reading unit and a second image signal obtained by reading of the patch pattern performed by the second image reading unit,
   wherein the outputting unit is configured to output the patch pattern corresponding to the color adjacent to the specific color in vicinity of a position corresponding to the position instructed by the specific-color specifying unit on the document.

* * * * *